(12) United States Patent
Hurwitz

(10) Patent No.: US 10,684,747 B2
(45) Date of Patent: Jun. 16, 2020

(54) CONDUCTING AN INDIVIDUALIZED, VIRTUALLY MODERATED, VIRTUAL REAL TIME METHODICAL DEBATE

(71) Applicant: David Aaron Hurwitz, Calabasas, CA (US)

(72) Inventor: David Aaron Hurwitz, Calabasas, CA (US)

( * ) Notice: Subject to any disclaimer, the term of this patent is extended or adjusted under 35 U.S.C. 154(b) by 0 days.

(21) Appl. No.: 16/287,812

(22) Filed: Feb. 27, 2019

(65) Prior Publication Data

US 2020/0034002 A1 Jan. 30, 2020

Related U.S. Application Data

(63) Continuation of application No. 14/934,117, filed on Nov. 5, 2015, now abandoned, which is a continuation of application No. 12/470,478, filed on May 21, 2009, now abandoned.

(51) Int. Cl.
  *G06F 3/0482* (2013.01)
  *G06F 3/0484* (2013.01)
  *H04L 29/06* (2006.01)

(52) U.S. Cl.
  CPC ........ *G06F 3/0482* (2013.01); *G06F 3/04842* (2013.01); *H04L 65/403* (2013.01)

(58) Field of Classification Search
  None
  See application file for complete search history.

(56) References Cited

U.S. PATENT DOCUMENTS

| | | | | |
|---|---|---|---|---|
| 6,144,375 | A * | 11/2000 | Jain | G11B 27/105 |
| | | | | 715/251 |
| 6,347,332 | B1 * | 2/2002 | Malet | G06Q 10/10 |
| | | | | 709/205 |
| 2006/0242185 | A1 * | 10/2006 | Paulus | H04L 29/08072 |
| 2008/0028314 | A1 * | 1/2008 | Bono | G11B 27/034 |
| | | | | 715/732 |

(Continued)

OTHER PUBLICATIONS

The Best Sties for Students to Create & Participate in Online Debates, Larry Ferlazzo, Oct. 2009, www.larryferlazzo.edublogs. org (Year: 2009).*

*Primary Examiner* — Dennis W Ruhl

(57) ABSTRACT

Disclosed herein is a computer implemented method and system for conducting an individualized, virtually moderated, and virtual real time debate. Debating topics and debating rules are defined for the debate. A group of panelists is selected for the debate based on the debating topics. An electronic debating platform is provided to the panelists for receiving one or more key points, responses, and counter-responses contributed by each of the panelists in non real time. The key points, the responses, and the counter-responses are governed by the debating rules. The prerecorded key points, responses, counter-responses, and one or more information components relevant to each of the key points are stringed together in sequence. The debate is presented to a viewer on a multimedia presentation layer. The presentation of the debate is customized by enabling the viewer to selectively navigate through the presentation using the sequenced key points, responses, counter-responses, and information components.

7 Claims, 10 Drawing Sheets

(56) References Cited

U.S. PATENT DOCUMENTS

| | | | | |
|---|---|---|---|---|
| 2008/0183829 | A1* | 7/2008 | Smilowitz | G06Q 10/109 709/206 |
| 2008/0184122 | A1* | 7/2008 | Grant | G06Q 10/10 715/723 |
| 2008/0222279 | A1* | 9/2008 | Cioffi | G06Q 10/10 709/223 |
| 2008/0263585 | A1* | 10/2008 | Gell | H04N 7/15 725/32 |
| 2009/0063991 | A1* | 3/2009 | Baron | G06Q 10/10 715/751 |
| 2010/0049683 | A1* | 2/2010 | Carter | G06Q 10/10 706/46 |

\* cited by examiner

```
<!--ExpertA.smil-->
<smil xmlns="http://www.w3.org/2001/SMIL20/Language"
xmlns:rn="http://features.real.com/2001/SMIL20/Extensions">
    <head>
        <meta name="title" content="Target File for a SMIL Hyperlink(s)"/>

<layout>
            <root-layout width="640" height="480" backgroundColor="#4C76D4"/>
            <region id="video_region"/>

</layout>
    </head>
    <body>

<video src="Videos/ExpertAPoint1.rm" region="video_region" regPoint="middle">
            <area href="AdditionalInfo.htm" actuate="onLoad" external="true" rn:sendTo="_rpcontextwin" sourcePlaystate="play">
                <rn:param name="width" value="300"/>
            </area>

<area href="ExpertAPoint1FollowUp.htm" begin="64.5s" actuate="onLoad" external="true" rn:sendTo="_rpcontextwin" sourcePlaystate="pause"/>

</video>

</body>
```

FIG. 5A

```
<!--ExpertAPoint1FollowUp.htm-->>

<meta http-equiv="Content-Language" content="en-us">

<meta name="Microsoft Border" content="b, default">
</head>

<body BGCOLOR="003399" TEXT="#FFFFFF" LINK="#CC0000">

<p>
 </p>

<table border="0" cellpadding="0" cellspacing="0" style="border-collapse: collapse" bordercolor="#111111" width="50%">
  <tr>
    <td width="100%">
<a href="ExpertAPoint1aResponses.smil"><font size="4" color="#C0C0C0">Watch
the disagreement at this point
and the ensuing follow-up</font></a></td>
  </tr>
  <tr>
    <td width="100%"> <p> </p>
    <p><font size="4" color="#C0C0C0"> <a href="ExpertAPoint1a.smil">Continue
    Listening to Expert A without interruption</a></font></td>
  </tr>
  <tr>
    <td width="100%"> <p> </p>
    <p><font size="4">Minimize window to return to Galileo Debate Page</font></td>
  </tr>
</table>

<p>
<font size="4" color="#C0C0C0"><br>

</font></p>

</body>

</html>
```

FIG. 5B

```
<!--ExpertAPoint1aResponses.smil -->

<smil xmlns="http://www.w3.org/2001/SMIL20/Language"
xmlns:rn="http://features.real.com/2001/SMIL20/Extensions">
    <head>
        <meta name="title" content="Target File for a SMIL Hyperlink(s)"/>

<layout>
            <root-layout width="640" height="480" backgroundColor="#4C76D4"/>
            <region id="video_region"/>
            <!--<regPoint id="middle" left="50%" top="50%" regAlign="center"/>1:09 PM 8/10/2005-->
        </layout>
    </head>
    <body>
        <par>
    <seq>
            <video src="rtsp://[streaming provider address]/dd_proto_site/ExpertAPoint1aR1.rm" region="video_region" regPoint="middle">
                <area href="ExpertAPoint1Resume.htm" begin="0s" actuate="onLoad" external="true" rn:sendTo="_rpcontextwin"
sourcePlaystate="play">
                    <rn:param name="width" value="300"/>
                </area>
            </video>
            <video src="rtsp://[streaming provider address]/dd_proto_site/ExpertAPoint1aC1.rm" region="video_region" regPoint="middle"/>
            <video src="rtsp://[streaming provider address]/dd_proto_site/ExpertAPoint1aR2.rm" region="video_region" regPoint="middle"/>
            <video src="rtsp://[streaming provider address]/dd_proto_site/ExpertAPoint1aC2.rm" region="video_region" regPoint="middle"/>
            <video src="rtsp://[streaming provider address]/dd_proto_site/ExpertAPoint1Continued.rm" region="video_region" regPoint="middle"/>
    </seq>
        </par>
    </body>
</smil>
```

FIG. 5C

```
<!--ExpertAPoint1a.smil-->

<smil xmlns="http://www.w3.org/2001/SMIL20/Language"
xmlns:rn="http://features.real.com/2001/SMIL20/Extensions">
    <head>
        <meta name="title" content="Target File for a SMIL Hyperlink(s)"/>

<layout>
            <root-layout width="640" height="480" backgroundColor="#003399"/>
            <!--<root-layout width="640" height="480" backgroundColor="#4C76D4"/>-->
            <region id="video_region"/>
            <!--<regPoint id="middle" left="50%" top="50%" regAlign="center"/>-->
        </layout>
    </head>
    <body>

<video src="ExpertAPoint1Continued.rm" region="video_region" regPoint="middle">
            <area href="DebateHomePageInfo.htm" actuate="onLoad" external="true" rn:sendTo="_rpcontextwin" sourcePlaystate="play"/>

</video>
    </body>

</smil>
```

FIG. 5D

```
<!--ExpertAPoint1Resume.htm-->

<html>

<head>

<meta http-equiv="Content-Language" content="en-us">

<title>SimplicioPoint1FollowUp</title>

<meta name="Microsoft Border" content="b, default">
</head>

<body BGCOLOR="003399" TEXT="#FFFFFF" LINK="#CC0000">

<p>
 </p>

<table border="0" cellpadding="0" cellspacing="0" style="border-collapse: collapse" bordercolor="#111111" width="50%">
  <tr>
    <td width="100%">
<a href="ExpertAPoint1a.smil"><font size="4" color="#C0C0C0">Continue listening to Expert A
finish Point 1 without any more of the discussion</font></a></td>
  </tr>
  <tr>
    <td width="100%"> </td>
  </tr>
  <tr>
    <td width="100%"> <p> </p>
    <p><font size="4">Minimize window to return to Debate Home Page</font></td>
  </tr>
</table>

<p>
<font size="4" color="#C0C0C0"><br>

</font></p>

</body>

</html>
```

FIG. 5E

CONDUCTING AN INDIVIDUALIZED, VIRTUALLY MODERATED, VIRTUAL REAL TIME METHODICAL DEBATE

CROSS REFERENCE TO RELATED APPLICATIONS

This application is a continuation application of non-provisional patent application Ser. No. 14/934,117, titled "Conducting An Individualized, Virtually Moderated, Virtual Real Time Methodical Debate", filed on Nov. 5, 2015 in the United States Patent and Trademark Office and now abandoned, which claims benefit to non-provisional patent application Ser. No. 12/470,478, titled "Conducting An Individualized, Virtually Moderated, Virtual Real Time Methodical Debate", filed on May 21, 2009 in the United States Patent and Trademark Office and now abandoned, which claims the benefit of provisional patent application No. 61/128,414, titled "Effective Debate Machine, Internet Multimedia Enabled, with Non-real Time Debate Creation, and Virtual Real Time, Virtual Moderator Viewing", filed on May 21, 2008 in the United States Patent and Trademark Office.

BACKGROUND

The computer implemented method and system disclosed herein, in general, relates to conducting debates. More particularly, the computer implemented method and system disclosed herein relates to conducting individualized, virtually moderated, and virtual real time methodical debates.

A component of effectiveness in debating is the availability of the debate to a viewing audience in a compelling manner. An in-depth coverage of a debate on a complex topic lasting over five hours, and conceivably fifty or more hours, is likely to alienate audiences who are not prepared to spend more than 30 minutes to two hours of attentive viewing. In a traditional debate, the panelists may not be able to methodically challenge each other without interruptions. A methodical real time debate would burden the viewing audience by making the audience wait extended periods between the delivery of an objectionable statement in the midst of a longer discourse, the expression of an objection, the counter-response, and so on for sufficient levels of follow-up discussion. Such a format is difficult for an audience to follow when multiple objectionable statements are being addressed at the same time, and the debate significantly exceeds the 30 minutes to 2 hours duration a typical audience is willing to devote to attendance. When one considers the complexity of the issues facing contemporary society, it is apparent that the time allocated to traditional debates is highly inadequate. Frequently, the experts are allowed a mere 15 minutes sum total each, or even less, to make all of their primary points, to respond to challenges from co-panelists, and to challenge statements made by their co-panelists. The practical necessity of such real time debates to be time-limited thus results in a product that can more accurately be described as thought-provoking entertainment than as a tool to methodically scrutinize the different representations of the facts presented by the expert panel.

Furthermore, traditional real time broadcasts of a debate are deficient since the possibility of making source documents available when panelists disagree on the wording of the source documents is low, because the source documents that the panelists refer to is not necessarily known in advance. Also, the traditional debates do not in a timely fashion incorporate charts, graphs, animations, and other visuals to explicate a point.

Traditional debates do not have an effective method for panelists to challenge each other. In some traditional formats, panelists are allowed to interrupt each other. Hence, every panelist may not have an opportunity to finish a point uninterrupted. Furthermore, such a format is usually disordered and does not allow the sequence of a key point being made, followed by a response, then a counter-response to the challenger by the initial person who made the key point, then a follow-up response by the challenger, and so-on, which is desired to methodically complete the discussion.

Another traditional format provides a setting where a first speaker takes a turn, and then a co-panelist responds. Sometimes the original speaker is given a chance to respond again, though typically the challenge ends there, and thus there is little or no opportunity for the back-and-forth succession that is necessary for a methodical discussion. This format is difficult for the audience to follow because the response is expressed minutes after the initial offending comment is made. A counter-response to the challenge, if expressed, is further separated in time with respect to any specific challenge.

For the reasons described above, the time duration for traditional debates necessarily limits the debate to only include a few panelists making only a few key points without the methodical discussion to reconcile the differences. Also, a real time environment makes it difficult for many panelists to contribute in an organized manner. Hence, the number of panelists rarely exceeds six. Additionally, retaining a number of panelists at the same time, if not also at the same place, for an extended period of time is often impractical. This makes it less likely that the most qualified panelists are assembled together, and thus the debate is more susceptible to a position being represented by a weak panelist. An additional source of bias is that the choice of panelists is often made by a single individual, typically the producer of the debate.

Also, the traditional format of debating does not address the need for extending the number of panelists to include specialist expert opinions. Debate constraints as described typically results in the necessity of having to rely on generalist panelists for complex issues, to the exclusion of sub-topic experts. A panelist considered as a topic generalist on a complex issue may wish to yield a portion of time to a sub-topic expert in order to illuminate an aspect best represented by such particular expertise.

Hence, there is a need for a more effective manner of conducting debates. There is a need for conducting an individualized, virtually-moderated, and virtual real time debate by creating the debate in a non-real time manner, and presenting the debate in an interactive manner, customized to the preferences of the viewer, and with the appearance in some aspects of a real time debate, but enhanced over the possibilities of a real time format.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for conducting an individualized, virtually-moderated, and virtual real time debate by creating the debate in a non-real time manner, and presenting the debate in an interactive manner, customized to the preferences of a viewer, and with the appearance in some aspects of a real time debate, but enhanced over the possibilities of a real time format.

The computer implemented method and system disclosed herein also addresses the need for conducting a debate that meets the requirements of methodical discussion, while at the same time providing the viewer an enjoyable and comprehensible experience. The computer implemented method and system disclosed herein addresses the above stated need by compiling the debates over days or weeks, during which the panelists remotely contribute at convenient times. This approach enables contributions of key points, responses, and counter-responses without interruptions, time for a back-and-forth methodical challenge, time to introduce ancillary materials such as charts, graphs, animations, text, links to source documents, etc. This approach gives experts the time required to consider their responses, consult books, other source documents, and colleagues. Such an approach is an improvement over traditional formats where the panelists are obligated to deliver an instantaneous answer under the intensity of the spotlight, when emotions are high. This approach enables experts to yield a portion of their time to specialists more qualified to cover specific aspects of the debate.

After the experts conclude the debate, the contributions, in the form of video segments are time shifted to enable a potential viewer to watch interruptions as though the interruptions had occurred right at an offending statement, immediately followed by further back-and-forth discussion in an exciting manner, which is impractical in a real time debate. The viewer is transformed from a passive viewer in traditional debates to an active virtual moderator since the viewer chooses the key points for viewing, and controls whether panelists are virtually interrupted or not, and also whether to watch the responses, the counter-responses and the ensuing follow-up or not. The computer implemented method and system disclosed herein can be generally used for all forms of debate such as public debates, online debates, televised debates, etc., and other forms of interactive and representational discussions.

Debating topics and debating rules are defined for the debate. The panelists generally have the liberty to make uninterrupted key points within and outside the scope of the debating topics. A group of panelists is selected for the debate based on several criteria. Since this format can accommodate more experts or panelists than traditional formats, there is more flexibility in objectively selecting the panelists. In an embodiment, one-third of the panelists are selected by a board of advisors, one-third of the panelists are selected by public voting through an Internet-based electronic debating platform, and one-third of the panelists are voted through the electronic debating platform by experts in the topics covered by the debate. The electronic debating platform is provided to the panelists for publishing their own contributions, and for viewing the key points, the responses, and the counter-responses contributed by each of the co-panelists at different times during debate creation and development. The contribution of the key points, the responses, and the counter-responses are governed by the debating rules. The debating rules define a permitted number of key points, responses, and counter-responses for each of the panelists, a permitted duration for each of the key points, the responses, and the counter-responses, a total time each of the panelists is allotted for contributing the key points, and a total time allotted for contributing the responses and the counter-responses.

The video segments of the prerecorded key points, the responses, and the counter-responses, and one or more information components relevant to each key point are combined into multimedia files, to enable virtual moderation by appropriately time shifting the video segments corresponding to a back-and-forth discussion around a challenged statement contained within the key point. The information components comprise, for example, digital source documents, hyperlinks, charts, graphs, graphics, animations, and other visual components. Time shifting the video segments imparts a logical flow sequence, enabling flexibility and interactivity in presentation of the debate to a viewer.

In the computer implemented method and system disclosed herein, the debate is virtually moderated by the viewer in an interactive manner. The debate is presented to a viewer on a multimedia presentation layer, wherein the presentation is customized by enabling the viewer to selectively choose the key points of viewer-chosen participating experts for viewing, choose whether to branch the presentation from watching the video clip of a key point to watching the video clip of an interruption immediately after the moment when the statement in dispute was made, choose to watch the remainder of the back-and-forth of the follow-up ensuing from the interruption, return at any time to where the key point video clip was interrupted, or to return at any time to watch a different key point in the debate.

The computer implemented system disclosed herein comprises a database, the electronic debating platform, the production platform, and the multimedia presentation layer. The database stores and catalogs the debating topics, debating rules, and information on the panelists. The electronic debating platform defines the debating topics and debating rules for the debate. The electronic debating platform receives the key points, responses, and counter-responses contributed by each of the panelists in non-real time. The electronic debating platform provides information on the debating topics used by the group of panelists in preparation for contributing the key points. The production platform strings the key points, the responses, and the counter-responses, and the information components relevant to each of the key points together in sequence. The multimedia presentation layer presents the debate to the viewer in an interactive manner.

The key points, the responses, and the counter-responses contributed by the panelists are received in digitally encoded audiovisual formats and text descriptions. Recording equipment such a web camera, a camcorder, a camera, an operator, and a studio are employed to capture the opinions of panelists in a digital format, or in a format that is compatible for digital encoding. The panelists may use suitable computers with broadband or high data rate network connections. A network, such as the Internet is used as the medium for uploading digital source material for presentation of the debate to the viewer.

In an embodiment, the multimedia presentation layer is implemented using a scripted or markup language used for describing multimedia presentations and platforms. The multimedia presentation layer uses, for example, a synchronized multimedia integration language (SMIL) to define one or more presentation structures such as timing, layout, visual transitions, and media embedding for the presentation of the debate. The presentation structures add interactivity to the presentation of the prerecorded key points, the responses, and the counter-responses of the panelists, and the information components. The debates are watched by the viewer over the Internet as streaming video or progressive download using multimedia devices capable of connecting to the Internet. The debates are also viewed over interactive television networks using integrated receivers/decoders or set top boxes. In another embodiment, the debates are also viewed on a television connected to interactively designed digital video discs (DVDs). The Internet in conjunction with a web browser supports other presentation protocols such as hyper text transfer protocol (HTML) pages containing text, hyperlinks, and visuals that also contribute to the interactivity of the viewer with the presentation of the debate. The televised debates using interactive television use graphical user interface (GUI) widgets to enhance interactivity of the viewer with the presentation.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIG. 5A is a code listing illustrating an example SMIL implementation of ExpertA.smil.

FIG. 5B illustrates an example HTML implementation of a new HTML page, declared as ExpertAPoint1FollowUp.htm.

FIGS. 5C-5D illustrate example SMIL implementations of ExpertAPoint1aResponses.smil and ExpertAPoint1a.smil respectively.

FIG. 5E illustrates an example HTML implementation of ExpertAPoint1Resume.htm.

DETAILED DESCRIPTION OF THE INVENTION

Figure 1:
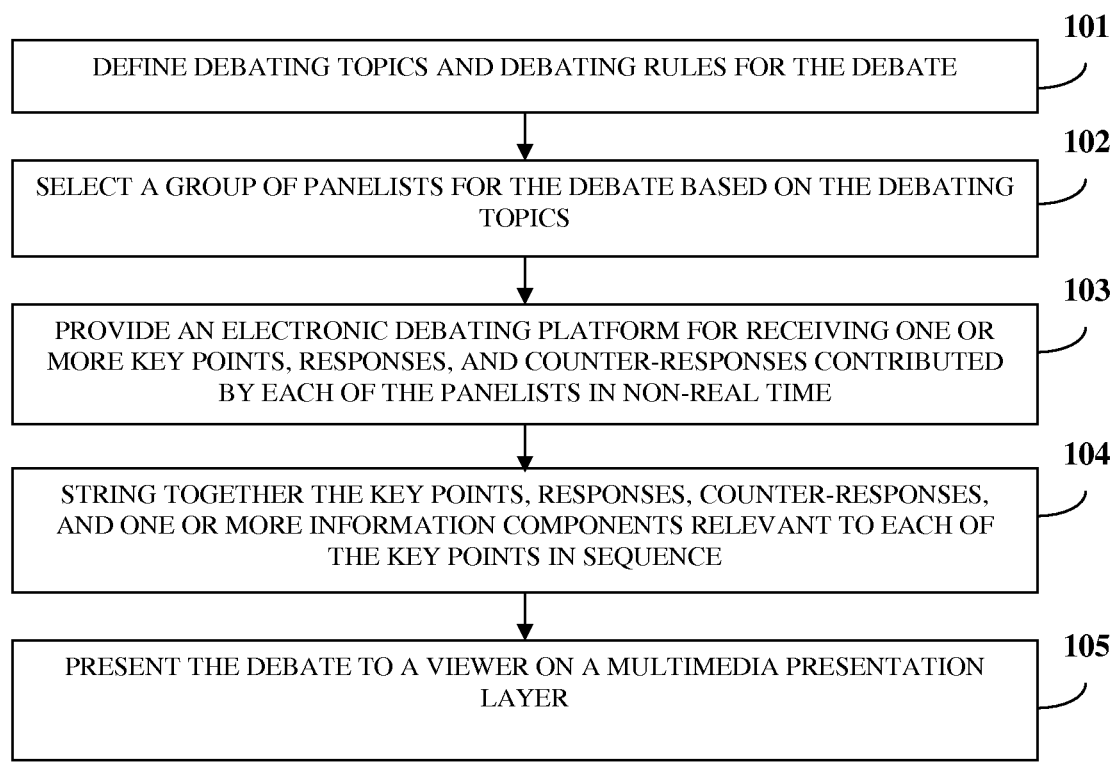
FIG. 1 illustrates a computer implemented method for conducting an individualized, virtually moderated, and virtual real time debate.

FIG. 1 illustrates a computer implemented method for conducting an individualized, virtually moderated, and virtual real time debate. The virtual real time debate, virtually moderated by the individual viewer is conducted by creating the debate in a non-real time manner, and presenting the debate in an interactive manner, customized to the preferences of the viewer, and with the appearance, in some respects, of a real time debate, albeit enhanced. The computer implemented method can be generally used for all forms of debate such as public debates, online debates, televised debates, etc., and other forms of interactive and representational discussions.

Figure 2:
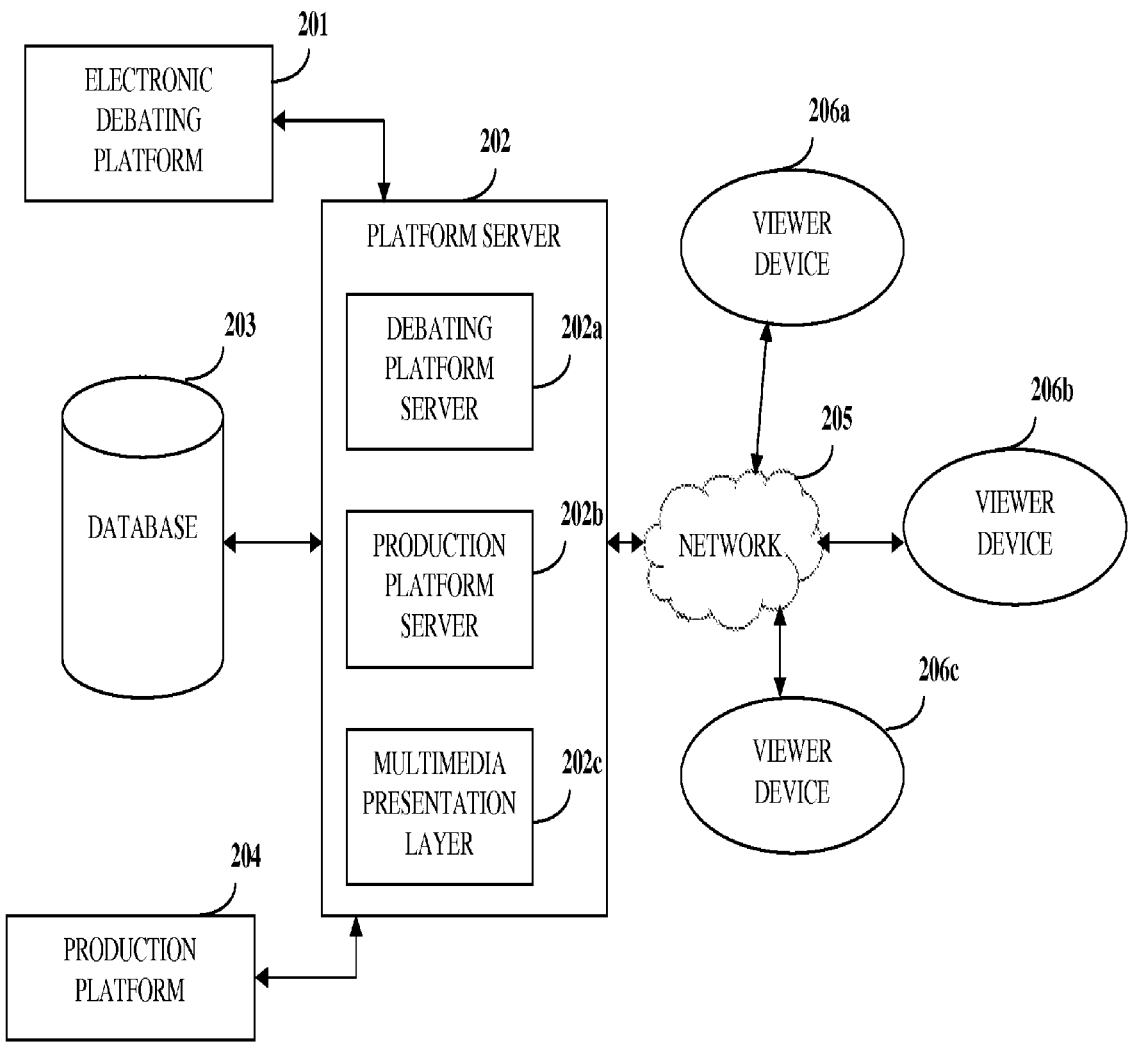
FIG. 2 illustrates a computer implemented system for conducting an individualized, virtually moderated, and virtual real time debate.

In the computer implemented method and system disclosed herein, the debate is virtually moderated by the viewer in an interactive manner. Debating topics, debating rules for the debate, and possibly specific sub-topics within the purview of the debate on a specific topic are defined 101. A group of panelists is selected 102 for the debate based on their expertise on the debate topic, or on one or more of the sub-topics. The group of panelists comprises, for example, experts and authorities on the topic who represent different points of view on the topic. An electronic debating platform 201, as illustrated in FIG. 2, is provided 103 to the panelists for receiving one or more key points, responses, and counter-responses contributed by each of the panelists in non real time. The key points, the responses, and the counter-responses are governed by the debating topics and debating rules. The responses for each key point comprise, for example, a counter-point or a challenge, a favorable point, a referral to an information component, etc. Although the detailed description refers to the responses to the key points, and the counter-responses to the responses, the scope of the computer implemented method and system disclosed herein is not limited to only the responses and counter-responses but may be extended to include ensuing responses, counter-responses, and any follow-up discussion therewith, until the discussion is, for example, objectively resolved, or discontinued by the panelists or the debating rules limit any further discussion. In an embodiment, the panelist making the original key point, or the panelist objecting to a specific statement, may withdraw at a certain point in the back-and-forth discussion and other panelists may take over, according to the debating rules and roles of defending, for challenging the statement under consideration.

The prerecorded key points, the responses, and the counter-responses, and one or more information components relevant to each of the key points or debating topics are stringed 104 together in sequence. The information components are used for examining factual accuracies, logical consistencies, and clarity of elucidation of the key points, the responses, and the counter-responses. The debate is presented 105 to the viewer on a multimedia presentation layer 202c, wherein the presentation of the debate is customized by enabling the viewer to selectively navigate through the presentation using the sequenced key points, responses, counter-responses, and information components. The strings are possible sequences of video clips, together with associated multimedia, which play in response to viewer selections. For instance, one string sequence comprises a video clip of a key point from the beginning up to where the first objection occurred, followed by a video clip of the response, followed by a video clip of the counter-response, and so on until the end of the back-and-forth video clips related to the particular response, further followed by the continuation of the video clip of the key point until the next navigation point at a subsequent response, and so on. The viewer at all times can interactively decide to return to the video clip of the key point where the key point was interrupted, or decide instead to watch a different key point. In an embodiment, the viewer can select an option beforehand to automatically play the interruptions, or can choose to play the key point uninterrupted and view the interruptions later.

The key points, the responses, and the counter-responses contributed by the panelists are received in digitally encoded audiovisual formats or text descriptions. Recording equipment such as a web cam, a camcorder, a camera, an operator, and a studio are employed to capture the opinions of panelists in different settings in a digital format, or in a format that is compatible for digital encoding. The panelists may use suitable computers with broadband or high data rate network connections. A network 205, such as the Internet is used as the transmission medium by the panelists for uploading digital source material via the electronic debating platform 201 for presentation of the debate to the viewer.

The multimedia presentation layer 202c is implemented using a scripted or markup language used for describing multimedia presentations and platforms. The multimedia presentation layer 202c uses, for example, a synchronized multimedia integration language (SMIL) to define one or more presentation structures comprising, for example, timing, layout, visual transitions, and media embedding for the presentation of the debate. The presentation structures add interactivity to the presentation of prerecorded key points, the responses, and the counter-responses of the panelists, and the information components. The debates are watched by the viewer over the Internet as streaming video or progressive download using multimedia devices capable of connecting to the Internet. The debates are also viewed over interactive television networks using integrated receivers/decoders or set top boxes. In another embodiment, the debates are also viewed on television connected to interactively designed digital video discs (DVDs). The Internet in conjunction with a web browser supports other presentation protocols such as hyper text transfer protocol (HTML) pages containing text, hyperlinks, and visuals that also contribute to the interactivity of the viewer with the presentation of the debate. The televised debates using interactive television use graphical user interface (GUI) widgets to enhance interactivity of the viewer with the presentation.

The information components comprise, for example, digital source documents, files, charts, graphs, graphics, animations, embedded hyperlinks, and other visuals. In an embodiment, the digital source document is presented to the viewer at a relevant time in the presentation, for example, when the panelists disagree on the wording of the source documents, the disagreement in fact having been captured on video during the initial phase of non-real time debate development when the panelists were contributing content. The debate is created in non-real time, thereby allowing time for arranging source documents to be made available in the presentation for settling any disputes about the wording of the source documents. For example, the viewer selectively navigates or branches through the presentation of the debate towards a prerecorded topic or panelists of interest. While pursuing a branch for viewing, the viewer watches the prerecorded video of one of the panelists referring to the wording of a source document for clarification or persuasive reasons. The co-panelist taking a different position may have challenged the exact phrasing in the source document during debate development, and the viewer selects to watch the prerecorded video of the co-panelist at this point in the presentation. A pop-up window appears at this point in the presentation to attract the attention of the viewer towards the wording of the source document. The viewer may select to refer to the wording of the source document by clicking an embedded link in the pop-up window. Therefore, the contributions of the panelists also comprise accompanying digital source documents, charts, graphs, graphics, animations, and other visuals to support their opinions.

The debating rules define a framework for non-real time panelist interaction and establish a formal setting for the panelists to make propositions or key points, oppositions or counterpoints, affirmative propositions, etc. For example, the debating rules define parameters such as a number of key points, a number of responses, and a number of counter-responses that each panelist is permitted to contribute, the duration for expressing each key point, each response, or each counter-response, a total time allotted for each panelist to make all key points, a total time each of the panelists is allotted for contributing the key points, a total time allotted for contributing said responses and said counter-responses, and a protocol for determining the priority of competing panelists for challenging a specific objectionable statement. The electronic debating platform 201 is also used to enforce the debating rules during the creation and development of the debate.

The electronic debating platform 201 provides information on the debating topics used by the group of panelists in preparation for contributing the key points, available reference materials on the world wide web (WWW), information about the panelists, links to books authored by the panelists etc.

FIG. 2 illustrates a computer implemented system for conducting an individualized, virtually moderated, and virtual real time debate. The computer implemented system comprises a database 203, an electronic debating platform 201, and a production platform 204 connected to a platform server 202. The platform server 202 comprises a debating platform server 202a, a production platform server 202b, and a multimedia presentation layer 202c. The database 203 stores and catalogs the debating topics, debating rules, and information on panelists. The electronic debating platform 201 defines the debating topics and debating rules for the debate at hand. The electronic debating platform 201, in conjunction with a debating platform server 202a of the platform server 202, receives the key points, the responses, and the counter-responses contributed by each of the panelists in non-real time, wherein the key points, the responses, and the counter-responses are governed by the debating rules. The production platform 204 strings together the key points, the responses, and the counter-responses, and one or more information components relevant to each of the key points or debating topics in sequence. The multimedia presentation layer 202c presents the debate to the viewer, wherein the presentation is customized by enabling the viewer to selectively navigate through the presentation using, and towards, the sequenced key points, the responses, the counter-responses, and the information components. The multimedia presentation layer 202c is implemented using SMIL for presentation structuring, or using other standardized scripting or markup languages used for describing multimedia presentations and platforms, for example, Action Script 3.0 and Flash of Adobe Inc. The multimedia presentation is transmitted over the network 205 to viewer devices 206a, 206b, and 206c for presentation. The network 205 used for transmission is, for example, an interactive television network or the Internet. The viewer devices 206a, 206b, and 206c comprise multimedia devices capable of connecting to the Internet, televisions with integrated receivers/decoders or set top boxes, televisions connected to interactively designed DVDs, etc.

The production platform 204, in conjunction with the production platform server 202b of the platform server 202 provides access to various multimedia production resources such as sequencing of multimedia content or scheduling, compression of multimedia content using specialized encoding schemes for storage and streaming, video editing applications for linear editing and non-linear editing, programming platform for creating HTML pages, etc. A production team responsible for producing the debate accesses the multimedia production resources via the network 205 or via a private network. The production team also collects information about the panelists for publication, brings together the panelists for the debate, provides internet websites where the viewer accesses the presentation of the debate, arranges programming to display the multimedia content created by the panelists, arranges programming of software to control the presentation flow of the debate, arranges display of information components or source materials, and is generally responsible for producing the debate.

Figure 3:
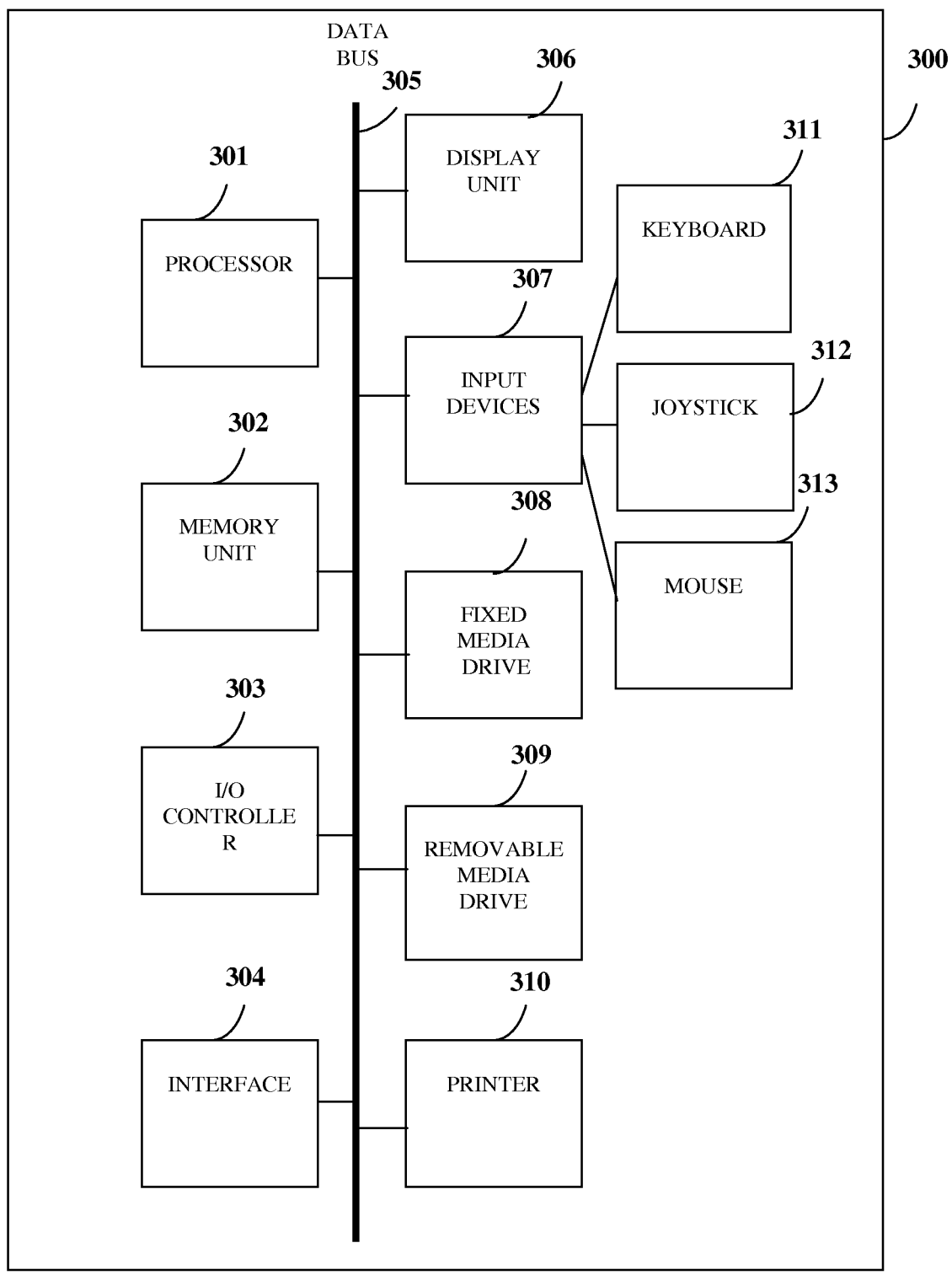
FIG. 3 exemplarily illustrates a computer system architecture used for implementing the electronic debating platform, the production platform, the platform server, and the viewer devices.

FIG. 3 exemplarily illustrates a computer system architecture used for implementing the electronic debating platform 201, the production platform 204, the platform server 202, and the viewer devices 206a, 206b, and 206c. The computer system 300 comprises a processor 301, a memory unit 302 for storing programs and data, an input/output (I/O) controller 303, and a display unit 306 communicating via a data bus 305. The memory unit 302 comprises a random access memory (RAM) and a read only memory (ROM). The computer system 300 comprises one or more input devices 307, for example, a keyboard 311 such as an alphanumeric keyboard, a mouse 313, a joystick 312, a touch-sensitive screen, etc. The computer system 300 communicates with other computer systems through an interface 304, comprising, for example, a Bluetooth interface, an infrared interface (IR interface), a WiFi interface, a universal serial bus interface (USB), a local area network or wide area network (LAN or WAN) interface, etc.

The computer system 300 further comprises a fixed media drive 308 and a removable media drive 309 for receiving removable media. The computer system 300 further comprises output devices, for example, a printer 310 for receiving and reading digital data on a compact disk, a digital video disk or other medium. Computer applications or programs are used for operating the computer system 300. The programs are loaded onto the fixed media drive 308 and into the memory unit 302 of the computer system 300 via the removable media drive 309. Applications are executed by double clicking a related icon or menu displayed on the display unit 306 using the mouse 313 or through other input devices 307. Further the computer system 300 employs an operating system for performing multiple tasks. The operating system manages execution of the software applications provided on the computer system 300. The operating system further manages security of the computer system 300, peripheral devices connected to the computer system 300, and network connections. The operating system employed on the computer system 300 recognizes keyboard inputs and pointing device inputs of a user, output display, files and directories stored locally on a hard drive. Different programs, for example, web browser, e-mail application, etc. initiated by the user are executed by the operating system with the help of the processor 301, for example, a central processing unit (CPU). The operating system monitors the use of the processor 301.

The software applications such as video editing applications are installed in the computer system 300 and the instructions are stored in the memory unit 302. The multimedia content is transferred from the database 203 to the computer system 300 through the interface 304 and via the network 205. Instructions for executing the video editing application are retrieved by the CPU from various modules in the video editing application. The locations of the instructions in the modules are determined by a program counter (PC). The program counter stores a number that identifies the current position in the program of the video editing application. The instructions fetched by the CPU from the program memory after being processed are decoded. The instructions are placed in an instruction register (IR) in the CPU. After processing and decoding, the CPU executes the instructions. The instructions comprise, for example, rendering the sequencing the multimedia content, compression of the multimedia content using specialized encoding schemes, etc.

At the time of execution, the instructions stored in the instruction register are examined to determine the operations to be performed. The specified operation is then performed by the CPU. The operations include arithmetic and logic operations. The operating system performs multiple routines for performing a number of tasks required to assign input devices 307, out put devices, and memory for execution of the video editing application. The tasks performed by the operating system comprise assigning memory to the video editing application and data, moving data between memory and disk units and handling input/output operations. The operating system performs the tasks on request by the operations and after performing the tasks, the operating system transfers the execution control back to the CPU. The CPU continues the execution to obtain one or more outputs. The outputs of the execution of the video editing application are displayed to the user on the display unit 306.

In an embodiment, the panelists are permitted to contribute remotely via video capturing devices, such as, a web camera or a video camera. The captured video, including any text descriptions, are uploaded to the electronic debating platform 201 through a web front-end over a period of days or weeks. Therefore, the panelists have the flexibility to make contributions at convenient times. The video is encoded locally before uploading, or can be encoded for streaming video at the production platform 204 managed by the production team. At the conclusion of the debate period, the debate content accumulated over the debate period are grouped based on key points or other grouping logic, and can be individually viewed. For example, at the completion of the production of the debate, the viewer may click a link, presented by the multimedia presentation layer 202c, to launch the video presentation of a particular key point contributed by a particular panelist. This selection-based viewing of the debate makes the debate more palatable to the viewer, as the viewer is not required to watch a lengthy linear debate. The viewer selects presentation content and the amount of the presentation content for viewing, prioritized by the interests of the viewer.

Figure 4A:
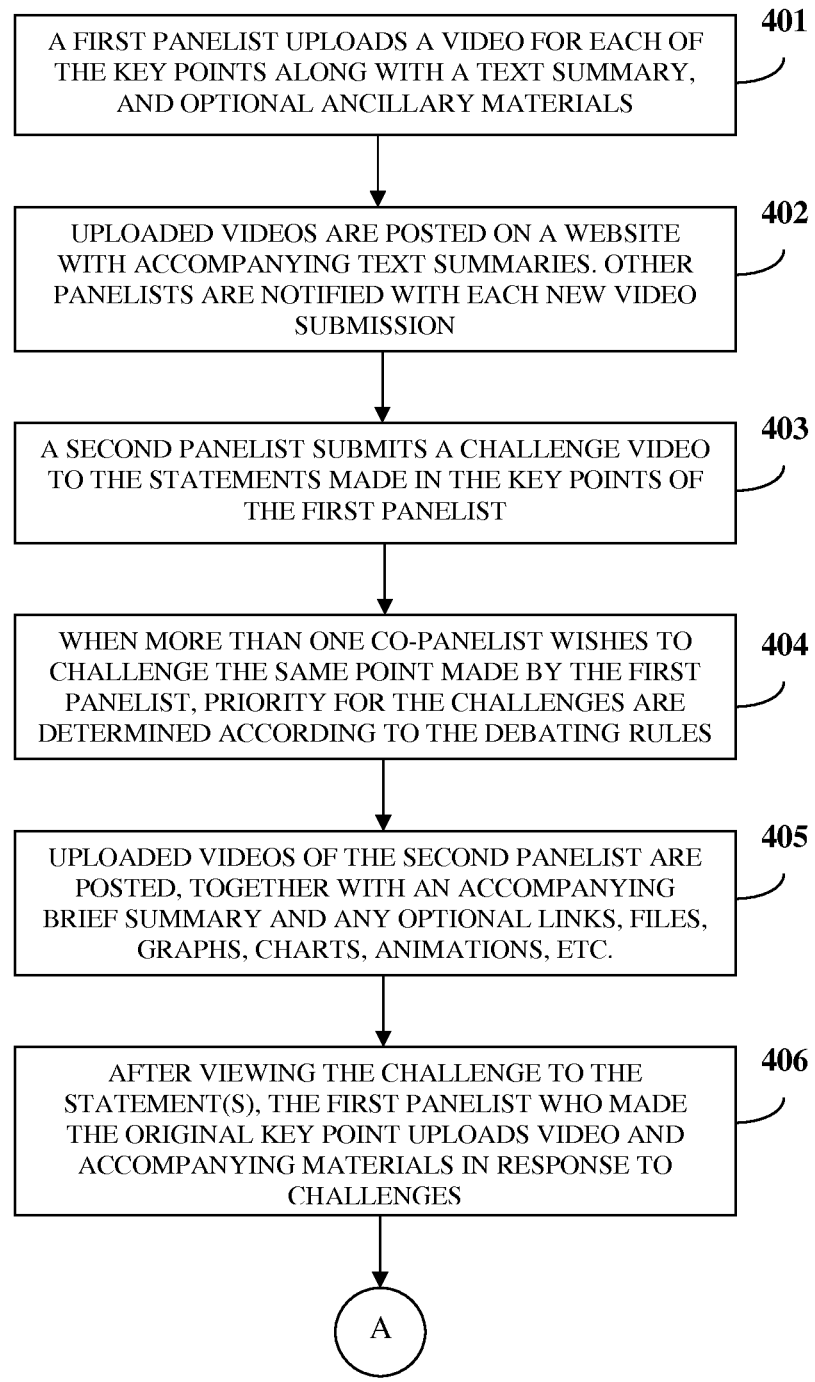
FIGS. 4A-4B exemplarily illustrate a flow diagram for creation and development of a debate by a group of panelists.
Figure 4B:
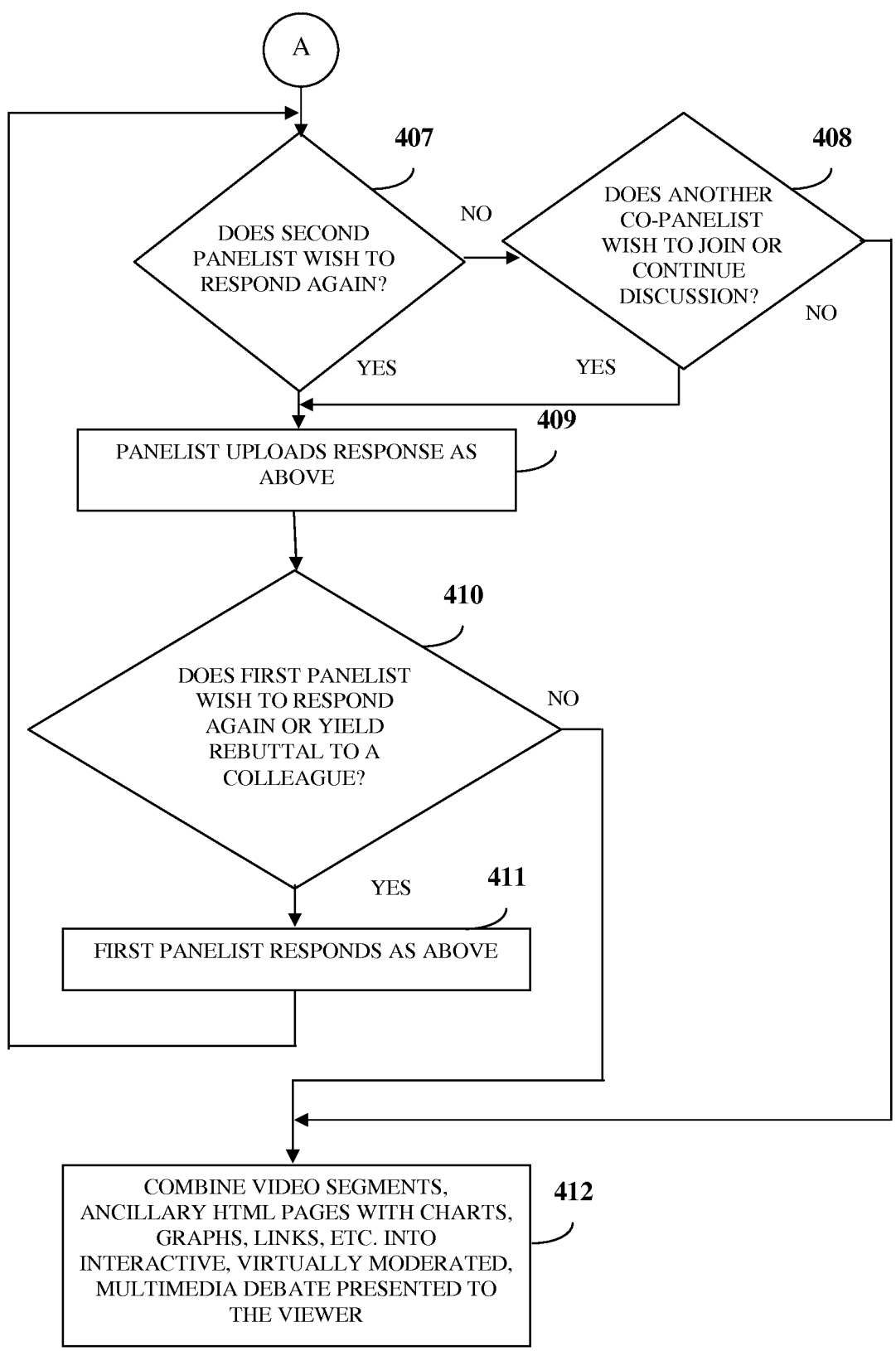

During the creation of the debate, the panelists submit video content containing their key points. Additionally, the panelists have the opportunity to view the video submissions of their fellow panelists. FIGS. 4A-4B exemplarily illustrate a flow diagram for creation and development of a debate by a group of panelists. A first panelist uploads 401 a video of a key point, along with a text summary and optional ancillary material using the web front-end of the electronic debating platform 201. The video of the first panelist is posted 402 on a website using the multimedia presentation layer 202c for presentation of an open debate. Other panelists are notified 402 of the video posting of the first panelist. When a second panelist desires to respond to a key point made by the first panelist with a challenge, the second panelist merely indicates the position on the timeline of the video where the contestable point is made, together with a video submission 403 of the second panelist's challenge to the contestable point. When more than one co-panelist wishes to challenge the same point made by the first panelist, the priority for the challenges are determined 404 according to the protocol defined in the debating rules.

The video representing the challenge of the second panelist is posted 405 on the website, including a text description of the challenge and any accompanying links, files, graphs, charts, animations, etc. using the multimedia presentation layer 202c. In turn, the first panelist, who initially made the contestable statement, views the second panelist's challenge video, and uploads 406 another video responding to the second panelist's challenge. Similarly, the second panelist has the opportunity to further respond back 407 and 409 with another video, and so on 410 and 411, until either the first panelist or the second panelist elects not to follow-up any further, or unless the permitted number of back- and forth responses defined by the debating rules has been exceeded. Additionally, since several co-panelists may desire to challenge a point or join or continue the discussion 408, debating rules are enforced to give the co-panelists turns to choose one or more key points that the co-panelists wish to challenge. When the debate is closed, the video segments of every panelist, the ancillary HTML pages, charts, graphs, links, etc. are combined 412 into an interactive, virtual-moderated, multimedia debate and posted for presentation using the production platform 204 and the multimedia presentation layer 202c.

The panelists are obligated to use their permitted time wisely, since the creation and development of the debate is unmoderated. The panelists may yield some amount of the permitted time to other experts of their choosing. Expert opinions are valuable to improve the quality of the debate, and bring in specialized expertise to cover specific topics in a field.

After the production of the debate, the debate is made available on the website for viewing in an interactive manner. The viewer essentially becomes the virtual moderator since the viewer can virtually allow an interruption to be viewed at the point where a challenger found a statement objectionable. For example, the viewer begins to watch the video of the primary point made by a first panelist by clicking an embedded link to start the presentation of the debate. This launches a video playback window, together with a child window, cascading with the video playback window. The child window contains related multimedia such as animations, charts, graphs, links, etc. The information presented in the child window dynamically changes to synchronize with the point or objection being narrated or raised by the panelist in played back video. When an objectionable statement is reached, a link dynamically appears, for example, within the child window that automatically pauses the video playback of the first panelist rendering the key point, and begins the video playback of the challenge by a second panelist. Alternatively, the viewer may choose to continue watching the key point uninterrupted, with the option to return later to watch the challenge. The viewer may decide at any point during the challenge and the consequent follow-up to the challenge that the key point was invalidated by the second panelist, and choose not watch the remaining succession of videos.

After the viewer concludes the remaining succession of videos ensuing from the challenge, the video playback of the key point resumes from where the playback had been paused to conclusion, if the viewer does not intervene by selecting links to skip to another key point. Therefore, a virtual "interruption" by the second panelist is watched immediately after the objectionable statement is made, without truly interrupting the first panelist making the key point.

The prerecorded and viewer-moderated format of the debate allows more content without alienating the viewer, as the viewer selectively watches the presentation of the debate. Hence, this format of the debate permits greater depth of coverage, a methodical scrutiny of the contested positions, a larger number of panelists to contribute in the debate, etc. Furthermore, the opportunity for a larger number of contributing panelists provides opportunities for combining several objective ways for selecting the panelists. For example, selections can be determined by an advisory panel to the debate production team, other selections by the experts in the field, and still others by voting or consensus of the general population of viewers conducted via the Internet. This format advantageously allows effective debates to be continuously available over the Internet for indefinitely long periods. In an embodiment, a debate already posted on a website for presentation is updated or modified at a future time to incorporate new information.

In an embodiment, each panelist is profiled on an HTML page dedicated to the panelist and the contributions of the panelist. The HTML page also includes ancillary material such as recommended reading materials, biography of the panelists, a picture of the panelist, links to purchase books published by the panelist, etc. The HTML page further comprises a list of embedded links with accompanying brief text descriptions of the key points the panelist wishes to express. When the viewer clicks the link to one of the key points, the multimedia presentation layer 202c launches the video and the accompanying HTML pages of the panelist, expressing the point described in the brief text description accompanying the link. In another embodiment, when the viewer is watching a video of a key point in the playback window, miniature videos of the co-panelists is played back in a separate window, showing the reactions of those co-panelists while the co-panelists were watching the video of the key point. In another embodiment, videos of random viewers are played back in small-size windows showing the reactions while the viewers were watching the same video. In another embodiment, viewers can watch the reactions of selected friends who had been or are synchronously watching the same video or multimedia presentation.

In an embodiment, the presentation is orchestrated through the markup language known as synchronized multimedia integration language 2.0 (SMIL 2.0). SMIL provides the presentation flexibility that allows the user to essentially assume the role of a virtual moderator and navigate through the presentation. Navigation through the presentation surrounding a key point comprises selecting different branch points in the presentation. For example, a branch point follows the playback of a key point, response, counter-response sequence, including any follow-up discussion, and reverts to the remainder of the playback of the key point from where an interruption occurred. In another example, the navigation continues playback of the key point without playing the response at any branch point. In another example, the navigation continues playback of the key point till the conclusion of the key point and later returns to the branch point to begin playback of the responses. In another example, the branch point follows the playback of the key point, response, counter-response sequence, including any follow-up discussion for an arbitrary period of time, and reverts to the playback of the remainder of the key point from where the interruption occurred. For example, during an ongoing presentation, new HTML pages and pop-up windows appear that enables the viewer to choose to continue watching a first video of a key point being expressed, or allow the first video to be paused to branch to a second video of a co-panelist challenging the key point, and pursue the branch along the succession of follow-up videos to the conclusion. A smooth visual transition from the first video to the second video gives the appearance of a real time interruption by the co-panelist to challenge the key point. If the viewer interrupts the playback of a video to watch another video, the viewer can resume the playback of the original video at any time. In another example, the viewer continues the playback of the video of the key point, and manually chooses to watch a challenge where it occurs in the time sequence. In another example, the viewer may return to the challenges after the playback of the key point is completed to watch those challenges.

In an exemplary scenario, the viewer clicks a link to begin playback of a key point contributed by a first panelist, designated as expert A, in a video playback window. The link opens a file referred to as a .ram file. A ram file is a terminology used to refer a supported media format by RealPlayer of RealNetworks Inc. Other multimedia implementations are based on QuickTime player of Apple Inc., Adobe Flash player and Action Script 3.0 of Adobe Inc., or Windows Media Player of Microsoft® Inc. The .ram file enables smooth communication between the Real Networks' media browser and the server that provides the multimedia content. The ram file also causes a declared SMIL file to open. An example ram file is illustrated as follows: # ExpertAPoint1 ram file://ExpertAPoint1.smil?screensize=double. This ram file causes an SMIL file declared as ExpertA.smil to open. FIG. 5A is a code listing illustrating an example SMIL implementation of ExpertA.smil. ExpertA.smil initiates the playback of the video of the key point of Expert A, named ExpertAPoint1.rm. Simultaneously, an HTML page also opens within a child window that cascades with the video playback window. This HTML file is declared as AdditionalInfo.htm.

At a first position on the timeline for the video playback, for example, 64.5 seconds on the timeline, the video is paused. The first position on the timeline coincides with the position where a second panelist, designated as expert B had wished to interrupt the expert A to present a first response for the key point of expert A. At the first position on the timeline, a new HTML page automatically opens replacing AdditionalInfo.htm. FIG. 5B illustrates an example HTML implementation of this new HTML page, declared as ExpertAPoint1FollowUp.htm. At the first position on the timeline where the video is paused, the viewer is provided with a choice of two embedded links in the implementation of ExpertAPoint1FollowUp.htm. For example, the first link reads "Watch the disagreement at this point and the ensuing follow-up", while the second link reads "Continue listening to Expert A without interruption". The first link opens ExpertAPoint1aResponses.smil and the second link opens ExpertAPoint1a.smil, respectively. FIGS. 5C and 5D illustrate example SMIL implementations of ExpertAPoint1aResponses.smil and ExpertAPoint1a.smil respectively. The second choice ExpertAPoint1a.smil plays ExpertAPoint1Continued.rm, which continues playback of the key point of expert A resuming from the first position on the timeline where the video was paused.

However, if the viewer selects the first choice, that is ExpertAPoint1aResponses.smil, the playback of a new video begins that presents the first response of expert B in response to a specific opinion, expressed by expert A, immediately prior to first position on the timeline. This response video is named as ExpertAPoint1R1.rm. When the playback of the first response begins, another HTML file declared as ExpertAPoint1Resume.htm opens. FIG. 5E illustrates an example HTML implementation of ExpertAPoint1Resume.htm. Assuming that the viewer has elected to watch the playback of the first response video, while not using the embedded link in ExpertAPoint1Resume.htm, a series of other video segments representing the response-counter-response succession are played after the completion of ExpertAPoint1R1.rm.

For instance, the videos that are played in the order of the point, response, and counter-response sequence comprise i) ExpertAPoint1aC1.rm, representing the counter-response of expert A for the first response of expert B, namely ExpertAPoint1R1.rm; ii) ExpertAPoint1aR2.rm, which is expressed by expert B and represents a reply to ExpertAPoint1aC1.rm; and iii) ExpertAPoint1aC2.rm, which is recorded by expert A and represents a reply to ExpertAPoint1aR2.rm. This example assumes that follow-up to the discussion concludes at ExpertAPoint1aC2.rm for the purposes of illustration. Also, for purposes of illustration, the example comprises one co-panelist, although the point, response, and counter-response successions may be extended to include multiple co-panelists.

At the conclusion of ExpertAPoint1aC2.rm, the playback of the video presenting key point of expert A is resumed from the first position on the timeline where the video was paused. In an embodiment, instead of resuming ExpertAPoint1.rm from the first position on the timeline and playing the video to conclusion, a video sub-segment is created that contains ExpertAPoint1.rm from the position on the timeline of the interruption until the end or until a subsequent interruption in the timeline, for example, due to a second response of another participating expert. The video sub-segment is named ExpertAPoint1Continued.rm. This embodiment is useful to circumvent any implementation errors or faults associated with the feature of resuming a video at an arbitrary point. The HTML implementation ExpertAPoint1Resume.htm contains an embedded link to ExpertAPoint1a.smil and may read "Continue listening to expert A, finish point 1 without any more of the discussion".

For purposes of illustration, the detailed description refers to a single viewer; however the scope of the method and system disclosed herein is not limited to the single viewer but may be extended to include an almost unlimited number of viewers and multiple levels of viewing.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In an embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C #, or JAVA. The software programs may be stored on or in one or more mediums as an object code. A computer program product comprising computer executable instructions embodied in a computer-readable medium comprises computer parsable codes for the implementation of the processes of various embodiments.

Where databases are described such as the database 203, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A computer implemented method for presenting an individualized, a virtually moderated, a virtual real time, and a methodical debate to a plurality of viewers, comprising:

in a plurality of computer servers comprising a platform server, wherein said platform server comprises a production platform server, and wherein said platform server hosts a multimedia presentation layer for said presentation of said methodical debate to said plurality of viewers in an interactive manner:

storing predefined debating topics and debating rules for a debate between a group of panelists, by a production team responsible for producing a customized debate on a database, wherein said production team selects said group of panelists for said debate based on said debating topics and said debating rules;

enforcing said debating rules by a debating platform in conjunction with a presentation application, comprising:

accepting video clips of key points, responses, and counter-responses from each of said panelists until number of said key points, said responses, and said counter-responses reaches a predetermined number;

accepting said video clips of said key points, said responses, and said counter-responses until duration of said key points, said responses, and said counter-responses reaches a predetermined time duration; and accepting said video clips of said key points, said responses, and said counter-responses until a total duration of said key points, said responses, and said counter-responses of each of said panelists reaches a predetermined total time duration;

providing a production platform to create said customized debate by said production team using multimedia resources available on said production platform, wherein said production platform enables said production team to perform steps comprising:

accepting said video clips and multimedia information components from said group of panelists;

creating branch points on a video timeline of each of said key points, wherein each of said branch points occur in said video timeline at the end of a challenged statement, and wherein each of said branch points represents a point of a challenge within said key point;

creating a loop of video clips consisting of alternating challenge and defense video clips which begin and end at each of said branch points by stringing together an initial video clip challenging a statement which plays immediately before a corresponding branch point, followed by a video clip representing a defense of said challenge, followed by a response of a challenger to said defense video clip, wherein said multimedia information components corresponding to appropriate segments are incorporated during play of debate video clips, wherein said multimedia information components supplemental to said key points, said challenge video clips, said defense video clips, said response video clips, and counter-response video clips are presented to said plurality of viewers at relevant segments on said video timeline, wherein said multimedia information components comprise digital source documents, hyperlinks, charts, graphs, graphics, animations, and visual components, and wherein said information components are used to examine factual accuracies, logical consistencies, and clarity of elucidation of each of said key points, each of said responses, and each of said counter-responses; and creating predefined positions on said video timeline to watch interruptions while viewing said key points, or return at any time to a branch point corresponding to a challenge video clip without watching a remainder of said challenge video clip;

presenting said created debate to said plurality of viewers by said multimedia presentation layer, wherein said presented debate is methodical, virtually moderated, and conducted in virtual-real time, wherein said presented debate is methodical as playing of said debate can be virtually stopped to enable careful cross-examination of specific statements, wherein said presented debate is virtually moderated as viewers can choose order of playing said key points and whether virtual interruption conversations are allowed or not during the playing of said key points, wherein said debate is virtual real-time as said challenge video clips are played by interrupting the playback of said key point, wherein said challenge video clips were created after the key point has been completed and uploaded, wherein video clips of said presented debate are played in a logical sequence, wherein said plurality of viewers selectively navigate through said presented debate, and wherein said selective navigation comprises:

selecting a video clip of any of said key points for watching with or without challenge interruptions, wherein said selected video clip of said key point is played from start to end of said selected key point when an uninterrupted viewing mode is selected by said viewers;

playing said selected video clip of said key point from a beginning up to a predefined position on a timeline of said selected video clip of said key point, when an interruption mode of viewing is chosen by said viewers, wherein one or more of said video clips of a challenge conversation is selectable at said predefined position consisting of said challenge video clips and said defense video clips comprising said challenge conversation, wherein said challenge conversation begins with a challenge video clip that challenges an objectionable statement in said key point, followed by a video clip of said defense of said challenge, wherein a sequence of challenge conversation video clips is played until completion, at which point play continues at said predefined position of said key point, and continues playing rest of said key point until completion, or until the next branch point is encountered, unless a viewer decides not to watch the remainder of the key point, and chooses to watch another key point in said debate;

in response to receiving a selection of a video clip of said challenge conversation at said predefined position on said timeline, presenting a pop up window containing an embedded link to a source document, and playing said video clip of said challenge conversation to an objectionable statement in a key point played prior to said predefined position, followed by video clip of defense of said challenge;

dynamically changing information presented in said pop up window to synchronize with point or objection being narrated in said selected video clip;

providing an option to return to said predefined position on said key point at any time while watching said challenge conversation; and providing an option to return to watch a different key point in a sequence of key points in said debate;

whereby customized presentation of said debate and said selection of viewing mode by said viewers enables presentation of said individualized, said virtually moderated, said virtual real time, and said methodical debate to said plurality of viewers.

2. The computer implemented method of claim 1, wherein said one or more key points, said responses, and said counter-responses are received in one of digitally encoded audiovisual formats and text descriptions.

3. The computer implemented method of claim 1, wherein said multimedia presentation layer is implemented using one of a scripting language and a markup language used for describing multimedia presentations and platforms, wherein said scripting language and said markup language comprise multimedia capabilities for dynamically linking said received video clips, received text descriptions, associated content pages, and said information components comprising said digital source documents, said hyperlinks, said charts, said graphs, said graphics, said animations, and said visual components, wherein said scripting language and said markup language replace said content pages with new content pages multiple times during the course of said multimedia presentation, and wherein said multimedia presentation comprises seamless playback of said dynamically linked multimedia content one after another.

4. A computer implemented system for presenting an individualized, a virtually moderated, a virtual real time, and a methodical debate to a plurality of viewers, comprising:

one or more computer servers for presenting said individualized, said virtually moderated, said virtual real time, and said methodical debate, wherein said one or more servers comprise a platform server, said platform server comprising a debating platform server and a production platform server, said platform server hosting a multimedia presentation layer for said presentation of said methodical debate to said plurality of viewers in an interactive manner, said one or more computer servers configured to:

store predefined debating topics and debating rules for a debate between a group of panelists on a database, wherein said production team is responsible for producing said customized debate, wherein said production team selects said group of panelists for said debate based on said debating topics;

enforce said debating rules in conjunction with a presentation application, comprising:

accepting video clips of key points, responses, and counter-responses from each of said panelists until number of said key points, said responses, and said counter-responses reaches a predetermined number;

accepting said video clips of said key points, said responses, and said counter-responses until duration of said key points, said responses, and said counter-responses reaches a predetermined time duration; and accepting said video clips of said key points, said responses, and said counter-responses until a total duration of said key points, said responses, and said counter-responses of each of said panelists reaches a predetermined total time duration;

provide a production platform to create a customized debate by using multimedia resources available on said production platform, wherein said production platform enables said production team to perform steps comprising:

accepting said video clips and multimedia information components from said group of panelists;

creating branch points on a video timeline of each of said key points, wherein each of said branch points occur in said video timeline at the end of a challenged statement, and wherein each of said branch points represents a point of a challenge within said key point;

creating a loop of video clips consisting of alternating challenge and defense video clips which begin and end at each of said branch points by stringing together an initial video clip challenging a statement which plays immediately before a corresponding branch point, followed by a video clip representing a defense of said challenge, followed by a response of a challenger to said defense video clip, wherein said multimedia information components corresponding to appropriate segments are incorporated during play of debate video clips, wherein said multimedia information components supplemental to said key points, said challenge video clips, said defense video clips, said response video clips, and counter-response video clips are presented to said plurality of viewers at relevant segments on said timeline, wherein said multimedia information components comprise digital source documents, hyperlinks, charts, graphs, graphics, animations, and visual components, and wherein said information components are used to examine factual accuracies, logical consistencies, and clarity of elucidation of each of said key points, each of said responses, and each of said counter-responses;

creating predefined positions on the video timeline to watch interruptions while viewing said key points, or return at any time to a branch point corresponding to a challenge video clip without watching a remainder of said challenge video clip;

present said created debate to said plurality of viewers, wherein said presented debate is methodical, virtually moderated, and conducted in virtual-real time, wherein said presented debate is methodical as playing of said debate can be virtually stopped to enable careful cross-examination of specific statements, wherein said presented debate is virtually moderated as viewers can choose order of playing said key points and whether virtual interruption conversations are allowed or not during the playing of said key points, wherein said debate is virtual real-time as said challenge video clips are played by interrupting playback of said the key point, wherein said challenge video clips were created after the key point has been completed and uploaded, wherein video clips of said presented debate are played in a logical sequence, wherein said plurality of viewers can selectively navigate through said presented debate, and wherein said selective navigation comprises:

selecting a video clip of any of said key points for watching with or without challenge interruptions, wherein said selected video clip of said key point is played from start to end of said selected key point when an uninterrupted viewing mode is selected by said viewers;

playing said selected video clip of said key point from a beginning up to a predefined position on a timeline of said selected video clip of said key point, when an interruption mode of viewing is chosen by said viewers, wherein one or more of said video clips of a challenge conversation are selectable at said predefined position consisting of said challenge video clips and said defense video clips comprising said challenge conversation, wherein said challenge conversation begins with a challenge video clip that challenges an objectionable statement in said key point, followed by a video clip of said defense of said challenge, wherein a sequence of challenge conversation video clips is played until completion, at which point play continues at said predefined position of said key point, and continues playing rest of said key point until completion, or until the next branch point is encountered, unless a viewer decides not to watch the remainder of the key point, and chooses to watch another key point in said debate;

in response to receiving a selection of a video clip of said challenge conversation at said predefined position on said timeline, presenting a pop up window containing an embedded link to a source document, and playing said video clip of said challenge conversation to an objectionable statement in a key point played prior to said predefined position, followed by video clip of defense of said challenge;

dynamically changing information presented in said pop up window to synchronize with point or objection being narrated in said selected video clip;

providing an option to return to said predefined position on said key point at any time while watching said challenge conversation; and providing an option to return to watch a different key point in a sequence of key points in said debate.

5. The system of claim 4, wherein said multimedia presentation layer is implemented using one of a scripting language and a markup language used for describing multimedia presentations and platforms.

6. The system of claim 4, wherein said multimedia presentation layer defines one or more presentation structures comprising timing, layout, visual transitions, and media embedding for said presentation of said methodical debate.

7. A computer program product comprising computer executable instructions embodied in a non-transitory computer-readable medium, wherein said computer program product comprises:

a first computer parsable program code for receiving and storing predefined debating topics and debating rules for a debate, wherein a group of panelists is selected for said debate based on said debating topics;

a second computer parsable program code for receiving one or more of each of key points, responses, and counter-responses contributed by each of said panelists in non-real time, wherein said key points, said responses, and said counter-responses are governed by said debating rules;

a third computer program code for enforcing said debating rules, comprising:

accepting video clips of said key points, said responses, and said counter-responses from each of said panelists until number of said key points, said responses, and said counter-responses reaches a predetermined number;

accepting said video clips of said key points, said responses, and said counter-responses until duration of said key points, said responses, and said counter-responses reaches a predetermined time duration; and accepting said video clips of said key points, said responses, and said counter-responses until a total duration of said key points, said responses, and said counter-responses of each of said panelists reaches a predetermined total time duration;

a fourth computer parsable program code for performing steps comprising:

accepting said video clips and multimedia information components from said group of panelists;

creating branch points on a video timeline of each of said key points, wherein each of said branch points occur in said video timeline at the end of a challenged statement, and wherein each of said branch points represents a point of a challenge within said key point;

creating a loop of video clips consisting of alternating challenge and defense video clips which begin and end at each of said branch points by stringing together an initial video clip challenging a statement which plays immediately before a corresponding branch point, followed by a video clip representing a defense of said challenge, followed by a response of a challenger to said defense video clip, wherein said multimedia information components corresponding to appropriate segments are incorporated during play of debate video clips, wherein said multimedia information components supplemental to said key points, said challenge video clips, said defense video clips, said response video clips, and counter-response video clips are presented to said plurality of viewers at relevant segments on said video timeline, wherein said multimedia information components comprise digital source documents, hyperlinks, charts, graphs, graphics, animations, and visual components, and wherein said information components are used to examine factual accuracies, logical consistencies, and clarity of elucidation of each of said key points, each of said responses, and each of said counter-responses; and creating predefined positions on the video timeline to watch interruptions while viewing said key points, or return at any time to a branch point corresponding to a challenge video clip without watching a remainder of said challenge video clip; and a fifth computer parsable program code for presenting said created debate to said plurality of viewers, wherein said presented debate is methodical, virtually moderated, and conducted in virtual-real time, wherein said presented debate is methodical as playing of said debate can be virtually stopped to enable careful cross-examination of specific statements, wherein said presented debate is virtually moderated as viewers can choose order of playing said key points and whether virtual interruption conversations are allowed or not during the playing of said key points, wherein said debate is virtual real-time as the challenge conversations are played by interrupting the playback of said key point, wherein said challenge video clips were created after the key point has been completed and uploaded, wherein video clips of said presented debate are played in a logical sequence, wherein said plurality of viewers can selectively navigate through said presented debate, and wherein said selective navigation comprises:

selecting a video clip of any of said key points for watching with or without challenge interruptions, wherein said selected video clip of said key point is played from start to end of said selected key point when an uninterrupted viewing mode is selected by said viewers;

playing said selected video clip of said key point from a beginning up to a predefined position on a timeline of said selected video clip of said key point, when an interruption mode of viewing is chosen by said viewers, wherein one or more of said video clips of a challenge conversation are selectable at said predefined position consisting of said challenge video clips and said defense video clips comprising said challenge conversation, wherein said challenge conversation begins with a challenge video clip that challenges an objectionable statement in said key point, followed by a video clip of said defense of said challenge, wherein a sequence of challenge conversation video clips is played until completion, at which point play continues at said predefined position of said key point, and continues playing rest of said key point until completion, or until the next branch point is encountered, unless a viewer decides not to watch the remainder of the key point, and chooses to watch another key point in said debate;

in response to receiving a selection of a video clip of said challenge conversation at said predefined position on said timeline, presenting a pop up window containing an embedded link to a source document, and playing said video clip of said challenge conversation to an objectionable statement in a key point played prior to said predefined position, followed by video clip of defense of said challenge;

dynamically changing information presented in said pop up window to synchronize with point or objection being narrated in said selected video clip;

providing an option to return to said predefined position on said key point at any time while watching said challenge conversation; and providing an option to return to watch a different key point in a sequence of key points in said debate.

* * * * *